Feb. 15, 1927. 1,617,407
W. L. MARDEN
METER
Filed Feb. 4, 1926  2 Sheets-Sheet 2
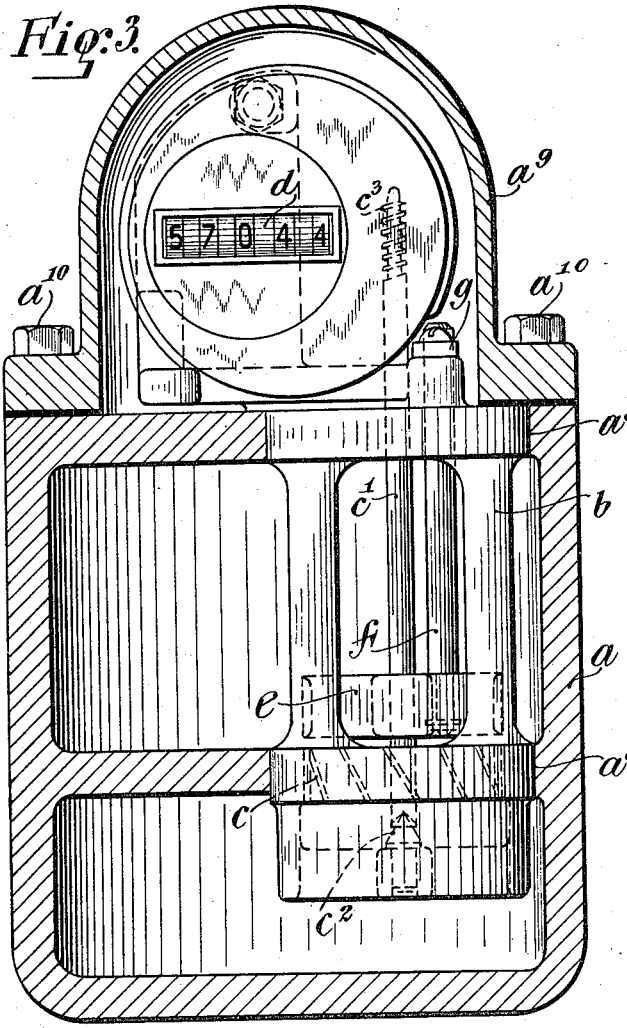
Fig. 3.
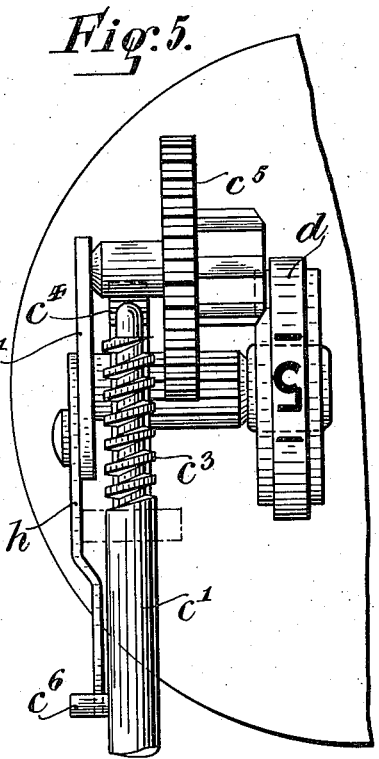
Fig. 5.
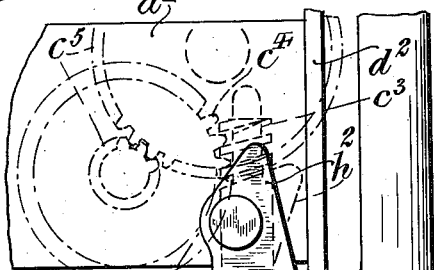
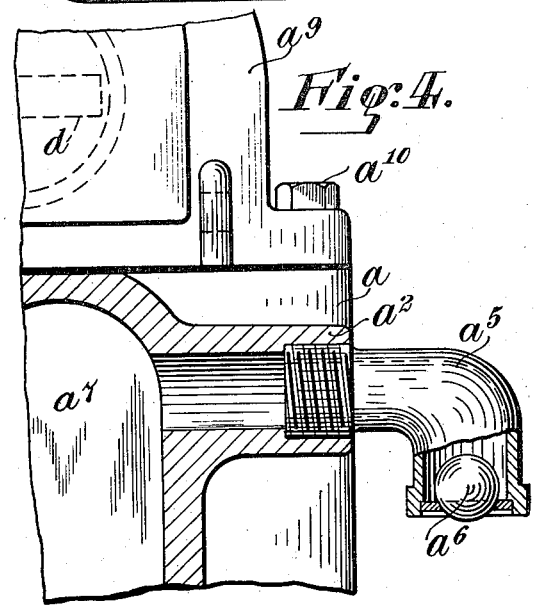
Fig. 4.
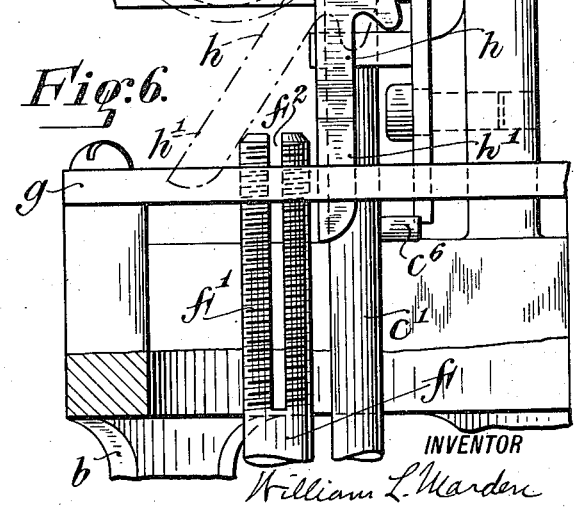
Fig. 6.
INVENTOR
William L. Marden
BY
Redding, Greeley, O'Shea & Campbell
ATTORNEYS Patented Feb. 15, 1927.

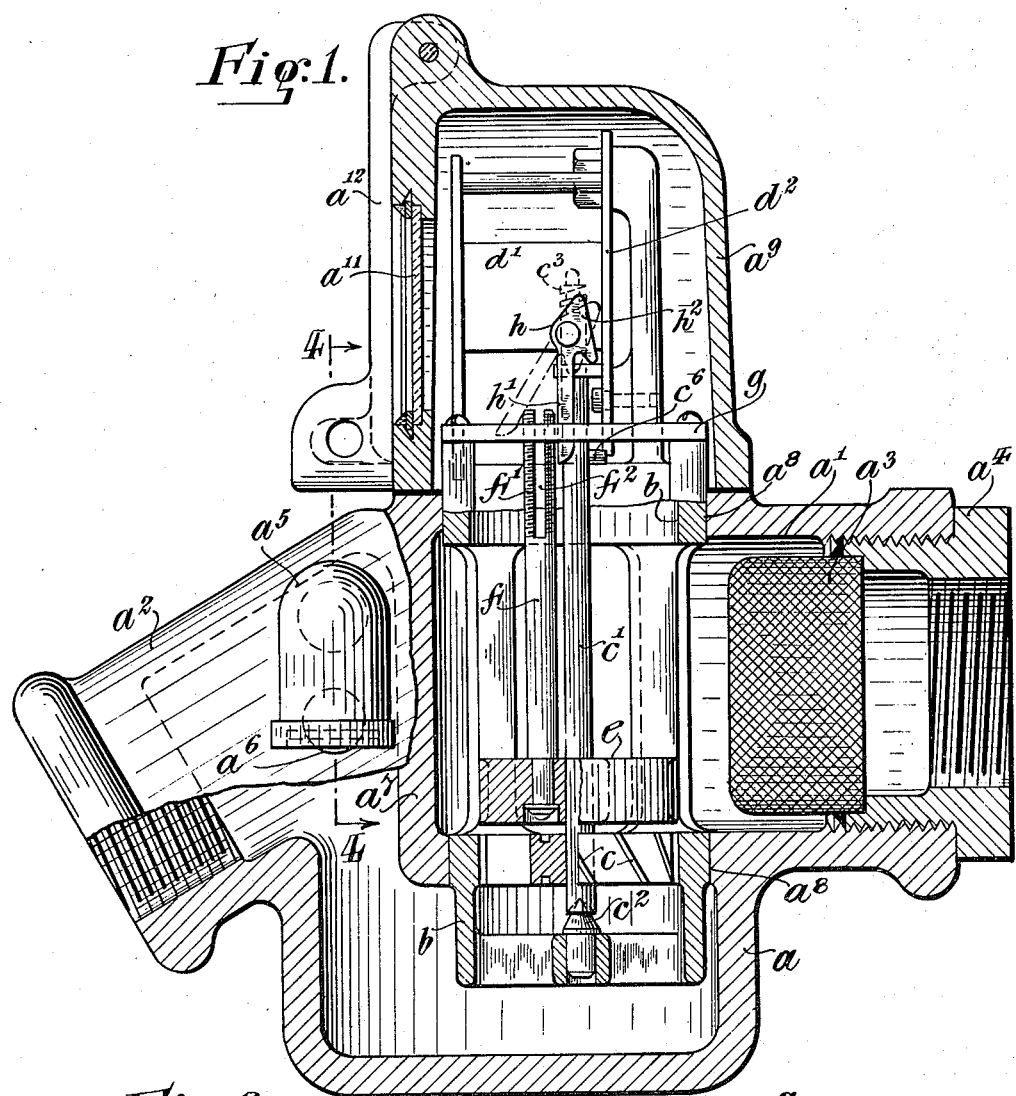
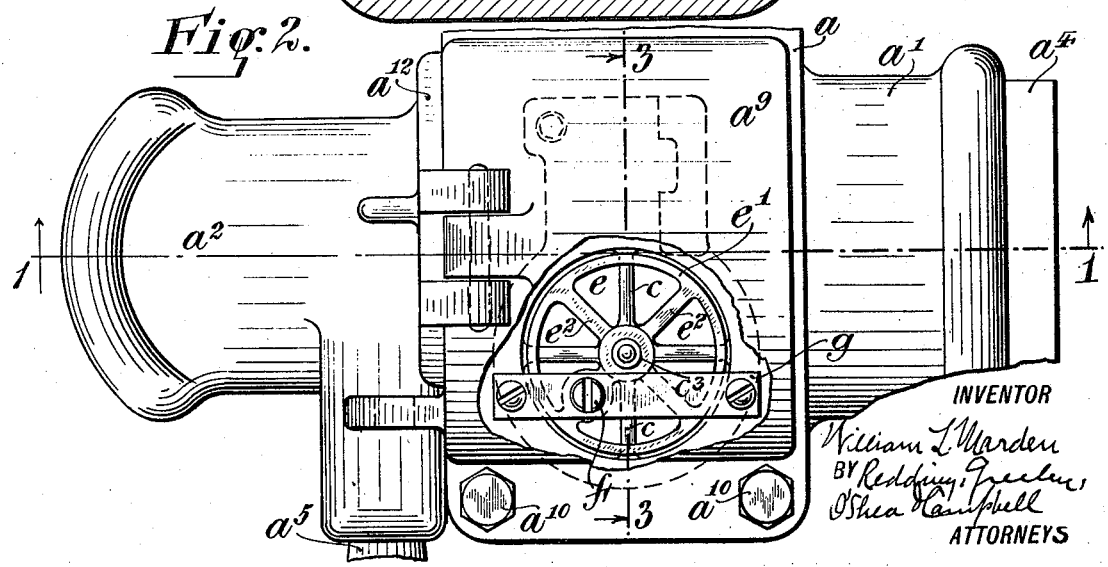

1,617,407

UNITED STATES PATENT OFFICE.

WILLIAM L. MARDEN, OF ELMHURST, NEW YORK, ASSIGNOR TO NEPTUNE METER COMPANY, OF NEW YORK, N. Y., A CORPORATION OF NEW JERSEY.

METER.

Application filed February 4, 1926. Serial No. 85,830.

This invention relates to metering devices of that type in which the register is actuated by the revolutions of a propeller wheel driven by the fluid as it passes through the meter. The invention has been developed with particular reference to metering devices of the character referred to, designed for use in connection with gasoline filling stations and has for its object to meet some of the conditions of such use, although some features of the improved construction will be found applicable to other specific uses. In the operation of such filling stations it is found that the rate of flow of the gasoline varies considerably in different installations for various causes, and as a consequence a meter which is calibrated for one installation will not register accurately in another installation; one object of the invention has been, therefore, to provide means whereby the metering devices can be adjusted readily so as to compensate for variations in flow. Another condition found to exist is that dishonest employees sometimes cheat the employer by running the meter backwards by the delivery of air under pressure into the discharge pipe, and another object of the invention is to make this impossible. Still another object of the invention has been to provide improved means for breaking the vacuum which would otherwise be created in the last of the flow of the liquid through the meter. The general object has been to provide a meter of generally improved construction.

The invention will be more fully explained hereinafter with reference to the accompanying drawings in which it is illustrated and in which:

Figure 1 is a view in partial sectional elevation, on the plane indicated by the broken line 1—1 of Figure 2, of a meter which embodies the several improvements.

Figure 2 is a top view of the same, with the cover partly broken away.

Figure 3 is a view in vertical sectional elevation on the plane indicated by the broken line 3—3 of Figure 2.

Figure 4 is a detail view partly in section on the plane indicated by the broken line 4—4 of Figure 1.

Figures 5 and 6 are detail views illustrating particularly the device for preventing backward movement.

The structure in which the invention is embodied has been designed with particular reference to convenience in manufacture, simplicity and security. As shown, it comprises a main casing $a$ with an inflow connection at $a'$ and a discharge connection at $a^2$. The inflow connection is provided with a strainer $a^3$, held in place by a threaded thimble $a^4$, and the discharge connection $a^2$ is provided with a downwardly opening air inlet $a^5$ having a check valve $a^6$, preferably of aluminum, to admit air for the purpose of breaking the vacuum which might otherwise be formed as the last of the gasoline flows from the meter, resulting in the continued operation of the metering devices after the gasoline has passed the propeller and therefore in inaccuracy of registration. Interiorly the casing $a$ is formed with a partition wall $a^7$ and with machined surfaces as at $a^8$ to receive the skeleton frame $b$ on which are supported the working parts, to be mentioned. The working parts can thus be removed and replaced readily as a unit. A removable cap or cover $a^9$, held to the main casing $a$ by any convenient means, such as bolts $a^{10}$, preferably capable of being sealed in position, covers the working parts and prevents improper manipulation, being itself provided with a sight opening, as at $a^{11}$, for observation of the register. The sight opening may itself be covered, if desired, by a hinged cover $a^{12}$ which can be locked in position.

The skeleton frame $b$ carries, between the inlet and the outlet, a propeller $c$ fixed on a vertical shaft $c'$ which at its lower end has a suitable bearing $c^2$ and at its upper end is in operative relation with the gearing through which the register is driven. As shown, shaft $c'$ is itself formed with a worm $c^3$ which meshes with the worm wheel $c^4$ of the train of gearing $c^5$ through which the register $d$, of usual construction, is driven.

At varying rates of flow the propeller $c$, if provision were not made to prevent, would rotate at different rates of speed, with resulting inaccuracy in the actuation of the register. If the flow is slow, the propeller is sluggish and the registration by the register might be too little. On the other hand, if the flow is rapid, the propeller might rotate so rapidly as to cause the register to overindicate. In the development of this invention it has been found that the operation of the propeller can be regulated to compensate for a different rate of flow and therefore to secure accuracy in the operation of the register by placing in proper relative position with respect thereto a regulator $e$, which consists of a peripheral shell $e'$, preferably cylindrical, supported by spider arms $e^2$. This regulator might be fixed in position by any suitable means, but in order that every meter may be adjusted or calibrated when it is installed so as to meet the conditions of the particular installation, it is so supported as to be capable of movement toward or form the propeller $c$. It will be evident from the foregoing statement of the causes of inaccuracy in meters of this type, that when the disc is moved downwardly, the flow of the liquid is throttled and thus any tendency of the wheel to overrun due to too great a flow is counteracted. Movement away from the propeller has the reverse effect, viz—it overcomes errors due to too sluggish movement of the wheel. As shown, it is carried by a rod $f$ which at its upper end, as at $f'$, is threaded for engagement with a bridge piece $g$, and is slotted, as at $f^2$, for engagement, when the cap $c^9$ is removed, by a screwdriver or other suitable tool. Thereby the regulator $e$ can be moved with reference to the propeller $c$ and thereby regulate the effect of the flowing liquid on the propeller so as to secure practically uniform registration for all rates of flow. Without such regulator the indication of the register may vary from accuracy by a large percentage under different rates of flow, but with the regulator the inaccuracy of registration is reduced to a small and negligible percentage.

To prevent backward rotation of the register, as by the action of a reverse current of air on the propeller $c$, there is hung upon some convenient member, as $d'$, of the register supporting frame, a stop $h$, the toe $h'$ of which hangs in convenient juxtaposition to a stud $c^6$, carried by the shaft $c'$, while the heel $h^2$ is shaped for coaction with a frame member $d^2$ so as to permit the latch to be swung by the stud $c^6$, when the shaft $c'$ rotates in the proper direction, so as to permit rotation of the shaft, as indicated by broken lines in Figure 6; and to contact with the frame member $d^2$, if the shaft should be rotated in the opposite direction, and thereby prevent movement of the latch to such a position as to permit passage of the stud $c^6$. Such contact with plate $d^2$ occurs through the lower projecting portion of the heel $h^2$. Thus the mechanism operates similar to a ratchet and pawl device.

It will be understood that various changes in details of construction and arrangement can be made to suit different conditions of use or the convenience of the manufacturer and that, except as pointed out in the accompanying claims, the invention is not restricted to the precise construction shown and described herein.

I claim as my invention:

1. A meter comprising a main casing having an inlet and an outlet and a partition wall, metering devices supported within the casing, and an air inlet provided with an inwardly opening check valve connected to the outlet.

2. A meter comprising a main casing having an inlet and an outlet and a partition wall, a propeller between the inlet and the outlet, a register, transmitting mechanism between the propeller and the register, a regulator mounted in proximity to the propeller and in axial relation therewith and movable bodily toward and from the propeller to regulate the effect of the flow on the propeller, and manually operated means to vary the position of the regulator with respect to the propeller.

3. A meter comprising a main casing having an inlet and an outlet and a partition wall, a propeller between the inlet and the outlet, a register, transmitting mechanism between the propeller and the register, a regulator comprising a peripheral shell and a supporting spider mounted in proximity to the propeller and in axial relation therewith and movable bodily toward and from the propeller to regulate the effect of the flow on the propeller, and manually operated means to vary the position of the regulator with respect to the propeller.

4. A meter comprising a main casing having an inlet and an outlet and a partition wall, a propeller between the inlet and the outlet, a register, transmitting mechanism between the propeller and the register, a regulator comprising a peripheral shell and a supporting spider, and means to support the same in adjusted position with respect to the propeller to vary the action thereon of the flow.

5. A meter comprising a main casing having an inlet and an outlet and a partition wall, a propeller between the inlet and the outlet, a register, transmitting mechanism between the propeller and the register, a regulator comprising a peripheral shell and a supporting spider, a shaft rotatably engaged at one end with the regulator and screw-threaded at the other end, and a bridge piece with which the shaft has screw-threaded engagement whereby the position of the regulator with respect to the propeller can be varied.

This specification signed this 2nd day of February, A. D. 1926.

WILLIAM L. MARDEN.